US012583596B2

(12) United States Patent
Tomes

(10) Patent No.: US 12,583,596 B2
(45) Date of Patent: Mar. 24, 2026

(54) AIRCRAFT PROPULSION SYSTEM

(71) Applicant: Pratt & Whitney Canada Corp.,
Longueuil (CA)

(72) Inventor: Nathan Tomes, Hamilton (CA)

(73) Assignee: Pratt & Whitney Canada Corp.,
Longueuil (CA)

( * ) Notice: Subject to any disclaimer, the term of this
patent is extended or adjusted under 35
U.S.C. 154(b) by 32 days.

(21) Appl. No.: 18/435,629

(22) Filed: Feb. 7, 2024

(65) Prior Publication Data

US 2025/0250016 A1    Aug. 7, 2025

(51) Int. Cl.
| | |
|---|---|
| *B64D 27/33* | (2024.01) |
| *B64D 35/022* | (2025.01) |
| *B64U 50/11* | (2023.01) |
| *B64U 50/19* | (2023.01) |
| *F01D 15/10* | (2006.01) |
| *F01D 15/12* | (2006.01) |
| *F02C 5/00* | (2006.01) |
| *F02C 6/18* | (2006.01) |

(52) U.S. Cl.
CPC .......... *B64D 27/33* (2024.01); *B64D 35/022*
(2024.01); *B64U 50/11* (2023.01); *B64U 50/19*
(2023.01); *F01D 15/10* (2013.01); *F01D*
*15/12* (2013.01); *F02C 5/00* (2013.01); *F02C*
*6/18* (2013.01); *B64D 2221/00* (2013.01)

(58) Field of Classification Search
CPC .. B64D 27/33; B64D 35/022; B64D 2221/00;
B64U 50/11; B64U 50/19; F01D 15/10;
F01D 15/12; F02C 5/00; F02C 6/18
See application file for complete search history.

(56) References Cited

U.S. PATENT DOCUMENTS

| | | | | |
|---|---|---|---|---|
| 4,147,590 A * | 4/1979 | Szekely | .................... | F02C 1/05 |
| | | | | 376/318 |
| 4,215,550 A | 8/1980 | Dinger | | |
| 7,980,052 B1 | 7/2011 | Paulino | | |
| 8,141,360 B1 * | 3/2012 | Huber | ................... | F01K 23/065 |
| | | | | 290/40 B |
| 10,145,291 B1 * | 12/2018 | Thomassin | ......... | F02B 19/1023 |

(Continued)

OTHER PUBLICATIONS

EP Search Report for EP Patent Application No. 25155880.5 dated
Jun. 17, 2025.

*Primary Examiner* — Hoang M Nguyen
(74) *Attorney, Agent, or Firm* — Getz Balich LLC

(57) ABSTRACT

A propulsion system for an aircraft includes an engine
assembly and a turbocompressor. The engine assembly
includes an engine and an interburner. The engine includes
an engine output shaft. The engine is configured to drive
rotation of a propulsor with the engine output shaft. The
interburner is configured to mix and burn an exhaust gas
from the engine with fuel to form a combustion gas. The
turbocompressor includes a turbine and a compressor. The
turbine and the compressor form a rotational assembly. The
rotational assembly includes a shaft, a bladed turbine rotor
of the turbine, and a bladed compressor rotor of the com-
pressor. The turbine is connected in fluid communication
with the interburner to receive the combustion gas. The
compressor is connected in fluid communication with the
engine to direct a compressed air to the engine. The rota-
tional assembly is mechanically independent of the engine
output shaft.

20 Claims, 2 Drawing Sheets

(56)                    References Cited

U.S. PATENT DOCUMENTS

| | | | |
|---|---|---|---|
| 10,746,090 | B2 | 8/2020 | Bigbee-Hansen |
| 12,043,402 | B1 * | 7/2024 | Lu ............................. F02C 6/12 |
| 12,162,613 | B1 * | 12/2024 | Wang ........................ F02K 5/00 |
| 2015/0285165 | A1 | 10/2015 | Steinwandel |
| 2016/0319742 | A1 | 11/2016 | Primus |
| 2023/0085551 | A1 | 3/2023 | Dussault |
| 2024/0010346 | A1 | 1/2024 | Smith |
| 2024/0175580 | A1 * | 5/2024 | Plamondon ............. F02B 41/10 |

* cited by examiner

AIRCRAFT PROPULSION SYSTEM

TECHNICAL FIELD

This disclosure relates to a propulsion system for an aircraft.

BACKGROUND OF THE ART

A propulsion system for an aircraft may be configured, for example, with an engine assembly including an intermittent internal combustion engine such as a rotary engine. Various configurations of such engine assemblies are known in the art. While these known engine assemblies may be suitable for their intended purposes, there is always room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a propulsion system for an aircraft includes an engine assembly and a turbocompressor. The engine assembly includes an engine and an interburner. The engine includes an air inlet, an exhaust outlet, and an engine output shaft. The engine output shaft is configured to be operably connected to a propulsor of the aircraft. The engine is configured to drive rotation of the propulsor with the engine output shaft. The interburner is connected in fluid communication with the exhaust outlet. The interburner is configured to mix and burn an exhaust gas from the engine with fuel to form a combustion gas. The turbocompressor includes a turbine and a compressor. The turbine and the compressor form a rotational assembly. The rotational assembly includes a shaft, a bladed turbine rotor of the turbine, and a bladed compressor rotor of the compressor. The shaft interconnects the bladed turbine rotor and the bladed compressor rotor. The turbine is connected in fluid communication with the interburner to receive the combustion gas. The compressor is connected in fluid communication with the air inlet to direct a compressed air to the engine. The rotational assembly is mechanically independent of the engine output shaft.

In any of the aspects or embodiments described above and herein, the engine assembly may further include a gearbox. The gearbox may be configured to operably connect the engine output shaft to the propulsor.

In any of the aspects or embodiments described above and herein, the propulsion system may further include an electrical assembly. The electrical assembly may include an electric generator. The electric generator may be operably connected to the rotational assembly. The rotational assembly may be configured to drive rotation of the electric generator to generate electrical power for one or more electrical aircraft loads of the aircraft.

In any of the aspects or embodiments described above and herein, the electrical assembly may further include an electric motor electrically connected to the electric generator. The gearbox may be configured to operably connect the electric motor to the propulsor.

In any of the aspects or embodiments described above and herein, the electric motor may be operably connected to the gearbox by a one-way clutch.

In any of the aspects or embodiments described above and herein, the electrical assembly may further include an energy storage device electrically connected to the electric generator and the electric motor.

In any of the aspects or embodiments described above and herein, the engine assembly may further include an intercooler. The intercooler may be connected in fluid communication with and between the compressor and the air inlet. The intercooler may be configured to cool the compressed air from the compressor.

In any of the aspects or embodiments described above and herein, the propulsion system may further include an air intake. The air intake may be connected in fluid communication with the compressor and the intercooler to supply ambient air to the compressor and the intercooler.

In any of the aspects or embodiments described above and herein, the propulsion system may further include the propulsor. The propulsor may be connected in fluid communication with and between the air intake upstream of the propulsor and the compressor and the intercooler downstream of the propulsor.

In any of the aspects or embodiments described above and herein, the engine may be an intermittent combustion engine.

According to another aspect of the present disclosure, an unmanned aerial vehicle (UAV) includes a propulsor, an engine assembly, a turbocompressor, and an electrical assembly. The engine assembly includes an engine and an interburner. The engine includes an air inlet, an exhaust outlet, and an engine output shaft. The engine output shaft is operably connected to the propulsor. The engine is configured to drive rotation of the propulsor with the engine output shaft. The interburner is connected in fluid communication with the exhaust outlet. The interburner is configured to mix and burn an exhaust gas from the engine with fuel to form a combustion gas. The turbocompressor includes a turbine and a compressor. The turbine is connected in fluid communication with the interburner to receive the combustion gas. The compressor is connected in fluid communication with the air inlet to direct a compressed air to the engine. The turbocompressor is mechanically independent of the engine output shaft. The electrical assembly includes an electric generator operably connected to the turbine. The electrical assembly is electrically connected to one or more electrical aircraft loads of the UAV.

In any of the aspects or embodiments described above and herein, the electrical assembly may further include an electric motor electrically connected to the electric generator. The electric motor may be operably connected to the engine output shaft and the propulsor.

In any of the aspects or embodiments described above and herein, the electrical assembly may further include an energy storage device electrically connected to the electric generator and the electric motor.

In any of the aspects or embodiments described above and herein, the engine assembly may further include an intercooler. The intercooler may be connected in fluid communication with and between the compressor and the air inlet. The intercooler may be configured to cool the compressed air from the compressor.

In any of the aspects or embodiments described above and herein, the engine may be an intermittent combustion engine.

According to another aspect of the present disclosure, a propulsion system for an aircraft, includes an engine assembly, a turbocompressor, and an electrical assembly. The engine assembly includes an intermittent combustion engine. The intermittent combustion engine includes an air inlet, an exhaust outlet, and an engine output shaft. The engine output shaft is configured to be operably connected to a propulsor of the aircraft. The intermittent combustion engine is configured to drive rotation of the propulsor with the engine output shaft. The turbocompressor includes a turbine and a compressor. The turbine is connected in fluid communication with the exhaust outlet. The compressor is connected in fluid communication with the air inlet to direct a compressed air to the engine. The turbocompressor is mechanically independent of the engine output shaft. The electrical assembly includes an electric generator, an electric motor, and an electrical distribution system electrically connecting the electric generator and the electric motor. The electric generator is operably connected to the turbine. The electric motor is operably connected to the engine output shaft.

In any of the aspects or embodiments described above and herein, the engine assembly may further include an inter-burner. The interburner may include an interburner inlet and an interburner outlet. The interburner inlet may be connected in fluid communication with the exhaust outlet. The inter-burner may be configured to mix and burn an exhaust gas from the intermittent combustion engine with fuel to form a combustion gas and direct the combustion gas to the turbine through the interburner outlet.

In any of the aspects or embodiments described above and herein, the engine assembly may further include a gearbox. The gearbox may be configured to operably connect the engine output shaft to the propulsor.

In any of the aspects or embodiments described above and herein, the electric motor may be operably connected to the engine output shaft by the gearbox.

In any of the aspects or embodiments described above and herein, the engine assembly may further include an inter-cooler. The intercooler may be connected in fluid commu-nication with and between the compressor and the air inlet. The intercooler may be configured to cool the compressed air from the compressor.

The present disclosure, and all its aspects, embodiments and advantages associated therewith will become more readily apparent in view of the detailed description provided below, including the accompanying drawings.

DETAILED DESCRIPTION

Figure 1:
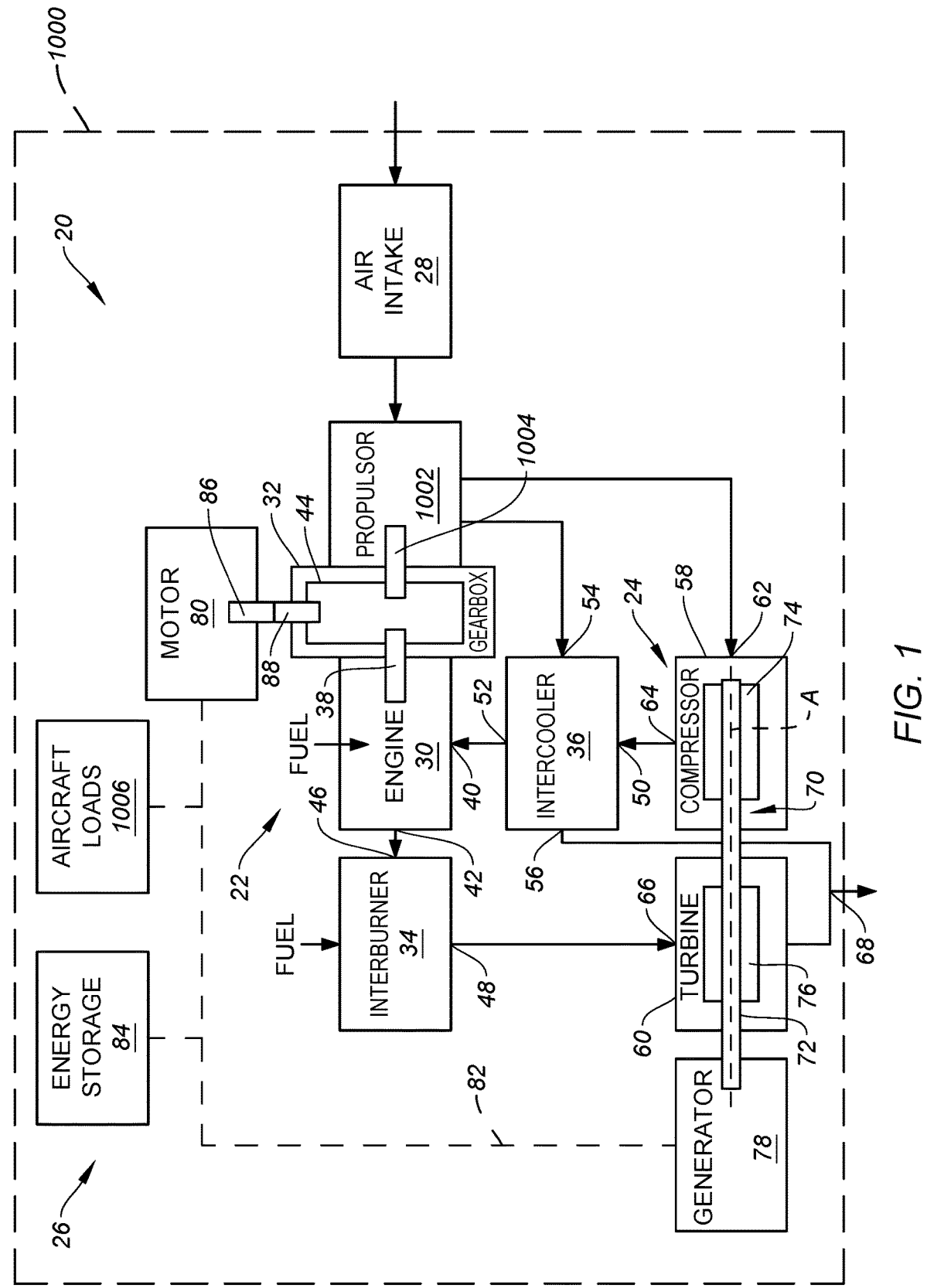
FIG. 1 schematically illustrates a propulsion system for an aircraft, in accordance with one or more embodiments of the present disclosure.

FIG. 1 schematically illustrates a propulsion system 20 for an aircraft 1000. Briefly, the aircraft 1000 may be an unmanned aerial vehicle (UAV, e.g., a drone). Alternatively, the aircraft 1000 may be a fixed-wing aircraft (e.g., an airplane), a rotary-wing aircraft (e.g., a helicopter), a tilt-rotor aircraft, a tilt-wing aircraft, or another aerial vehicle. The propulsion system 20 is configured to facilitate propul-sion and electrical power generation for the aircraft 1000. For example, the propulsion system 20 is configured to drive rotation of a propulsor 1002 (e.g., a propeller, a fan, a main rotor for a helicopter, etc.) of the aircraft 1000 to provide propulsion (e.g., generate thrust) and/or to provide lift for the aircraft 1000.

The propulsion system 20 of FIG. 1 includes an engine assembly 22, a turbocompressor 24, an electrical assembly 26, and an air intake 28.

The engine assembly 22 includes an engine 30, a gearbox 32, an interburner 34, and an intercooler 36.

The engine 30 configured as an internal combustion engine configured to use intermittent combustion during operation. In other words, the engine 30 may be an engine configuration other than a gas turbine engine configuration. For example, the engine 30 may be a reciprocating engine such as, but not limited to, a piston engine or a rotary engine (e.g., a Wankel engine). The engine 30 includes an engine output shaft 38, an air inlet 40, and an exhaust outlet 42. The engine 30 is configured to drive rotation of the engine output shaft 38. The engine output shaft 38 is operably connected (e.g., coupled) to the gearbox 32. The engine 30 is config-ured to receive compressed air from the intercooler 36 at the air inlet 40 and directs exhaust gas to the interburner 34.

The gearbox 32 includes at least one gear assembly 44 operably connected (e.g., coupled) with and between the engine output shaft 38 and the propulsor 1002 to facilitate the engine 30 (e.g., the engine output shaft 38) driving rotation of the propulsor 1002. For example, the gear assembly 44 may operably connect the engine output shaft 38 with an input shaft 1004 of the propulsor 1002. The gear assembly 44 may include an epicyclic gear assembly (e.g., a planetary gear assembly) operably connecting the engine output shaft 38 and the propulsor 1002. The present disclo-sure, however, is not limited to any particular gear configu-ration for the gear assembly 44. The gear assembly 44 may be configured as a speed-changing gear assembly to drive rotation of the propulsor 1002 at a different (e.g., reduced) rotational speed relative to the engine output shaft 38.

The interburner 34 forms a combustion chamber in which the exhaust gas from the engine 30 is mixed and burned with fuel. The interburner 34 includes an inlet 46 and an outlet 48. The inlet 46 in connected in fluid communication with the exhaust outlet 42 to receive exhaust gas from the engine 30. The interburner 34 is configured to direct combustion gas to the turbocompressor 24.

The intercooler 36 is configured as a heat exchanger for cooling the compressed air directed to the air inlet 40 of the engine 30. The intercooler 36 includes a first inlet 50 and a first outlet 52 for a primary heat exchanger side of the intercooler 36. The intercooler 36 includes a second inlet 54 and a second outlet 56 for a secondary heat exchanger side of the intercooler 36. The intercooler 36 is configured to receive compressed air from the turbocompressor 24 at the first inlet 50. The compressed air is cooled by heat transfer from the primary heat exchanger side to the secondary heat exchanger side, and directed to the air inlet 40 of the engine 30 from the first outlet 52. The intercooler 36 is configured to receive cooling air (e.g., ambient air) from the air intake 28 at the second inlet 54. For example, the second inlet 54 of FIG. 1 is connected in fluid communication with and downstream of the propulsor 1002 to receive cooling air from the air intake 28 directed and/or compressed by the propulsor 1002. The intercooler 36 is configured to exhaust this cooling air from the propulsion system 20 through the second outlet 56.

The turbocompressor 24 includes a compressor 58 and a turbine 60. The compressor 58 includes an inlet 62 and an outlet 64. The compressor 58 is configured to receive air (e.g., ambient air) from the air intake 28 at the inlet 62. For example, the inlet 62 of FIG. 1, like the second inlet 54, is connected in fluid communication with and downstream of the propulsor 1002 to receive cooling air from the air intake 28 directed and/or compressed by the propulsor 1002. The outlet 64 is connected in fluid communication with the intercooler 36 (e.g., the first inlet 50) to direct compressed air to the intercooler 36. The turbine 60 includes an inlet 66 and an outlet 68. The inlet 66 is connected in fluid communication with the interburner 34 (e.g., the outlet 48). The turbine 60 is configured to exhaust to exhaust the combustion gas from the propulsion system 20 through the outlet 68.

Components of the compressor 58 and the turbine 60 form a rotational assembly 70 mounted for rotation about a rotational axis A (e.g., an axial centerline of the turbocompressor 24). The rotational assembly 70 includes a shaft 72, a bladed compressor rotor 74 for the compressor 58, and a bladed turbine rotor 76 for the turbine 60. The shaft 72 interconnects the bladed compressor rotor 74 and the bladed turbine rotor 76.

The electrical assembly 26 includes an electric generator 78, an electric motor 80, and an electrical distribution system 82. The electrical assembly 26 may additionally include an energy storage device 84.

The electric generator 78 is operably connected (e.g., coupled) to the rotational assembly 70. For example, the electric generator 78 may be directly connected to the shaft 72. Alternatively, the electric generator 78 may be indirectly connected to the shaft 72, for example, by a gearbox having a gear assembly configured to drive rotation of the electric generator 78 at a different rotational speed than the shaft 72. The electric generator 78 is electrically connected to the electrical distribution system 82. The electric generator 78 is configured to generate an electrical power output, in response to driving rotation from the rotational assembly 70, and direct the electrical power output to the electrical distribution system 82. The electrical power output of the electric generator 78 may be in the form of an alternating current (AC) or a direct current (DC), and the present disclosure is not limited to any particular configuration of the electric generator 78.

The electric motor 80 of FIG. 1 includes an output shaft 86. The electric motor 80 may additionally include a clutch 88. The output shaft 86 is operably connected (e.g., coupled) to the engine 30 and the propulsor 1002 by the gearbox 32 (e.g., the gear assembly 44). For example, the output shaft 86 may be coupled with the gear assembly 44 by the clutch 88. The clutch 88 may be configured as a one-way clutch (e.g., a sprag clutch) configured to allow the electric motor 80 to drive or assist rotation of the engine 30 and/or the propulsor 1002, but to prevent the electric motor 80 from being rotationally driven by the engine 30 or the propulsor 1002. The electric motor 80 is electrically connected to the electrical distribution system 82 and configured to receive electrical power from the electrical distribution system 82 for operation of the electric motor 80.

The electrical distribution system 82 electrically connects components of the electrical assembly 26. The electrical distribution system 82 includes switchgear, cables, wires, breakers, switches, and/or other electrical components to effect the transfer of electrical power between components of the electrical assembly 26. The electrical distribution system 82 may additionally include one or more electrical power controllers, for example, to control a magnitude and/or direction of electrical current flow to components of the electrical assembly 26. The electrical distribution system 82 is configured to supply electrical power (e.g., from the electric generator 78 and/or the energy storage device 84) to one or more electrical aircraft loads 1006 of the aircraft 1000. Examples of the electrical aircraft loads 1006 include, but are not limited to, electronic control systems, communication systems, and navigation systems, optical equipment, electrical actuators, and lasers.

The energy storage device 84 may be configured to store electrical energy (e.g., generated by the electric generator 78) for use by components of the electrical distribution system 82 and/or the electrical aircraft loads 1006. The energy storage device 84 may be configured as a battery, a capacitor (e.g., a supercapacitor), and/or another electrical energy storage device. For example, the energy storage device 84 may be configured as a battery including a plurality of battery modules (e.g., battery packs), battery cells, and/or the like electrically connected together in series and/or parallel as necessary to configure the battery with the desired electrical characteristics (e.g., voltage output, current output, storage capacity, etc.). The present disclosure is not limited to any particular battery configuration. For example, the battery (e.g., and its battery cells) may be configured as a rechargeable battery having a battery chemistry such as, but not limited to, lead acid, nickel cadmium (NiCd), nickel-metal hydride (Ni-MH), lithium-ion (Li-ion), lithium-polymer (Li-poly), lithium metal, and the like.

Figure 2:
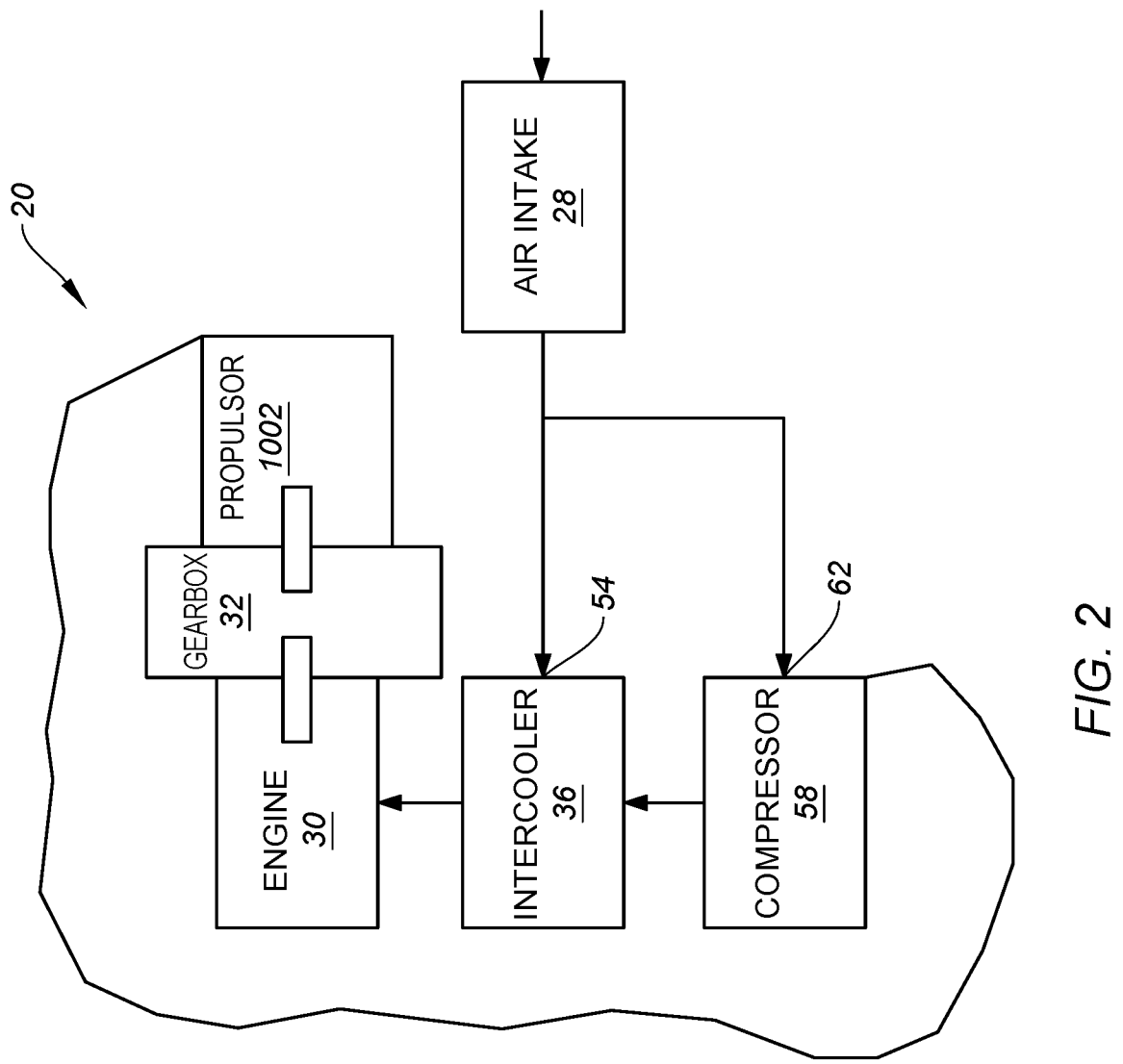
FIG. 2 schematically illustrates a portion of another propulsion system for an aircraft, in accordance with one or more embodiments of the present disclosure.

The air intake 28 is configured to receive and direct ambient air to the intercooler 36 (e.g., the second inlet 54) and the compressor 58 (e.g., the inlet 62). The air intake 28 may form a duct for the propulsor 1002 (e.g., within which duct the propulsor 1002 may be disposed). Alternatively, the air intake 28 may form a scoop or other opening at an exterior of the aircraft 1000 or its propulsion system 20. The air intake 28 may be disposed upstream of the propulsor 1002 and configured to direct ambient air to the propulsor 1002. Alternatively, as shown in FIG. 2, the air intake 28 may be independent of the propulsor 1002. For example, for propeller configurations of the propulsor 1002, the air intake 28 may supply ambient air directly to the intercooler 36 (e.g., the second inlet 54) and/or the compressor 58 (e.g., the inlet 62).

In operation of the propulsion system 20, ambient air is directed from the air intake 28 (e.g., through the propulsor 1002) to the intercooler 36 (e.g., the second inlet 54) and the compressor 58 (e.g., the inlet 62). The ambient air is compressed by the compressor 58, directed through the intercooler 36 where the compressed air is cooled, and then supplied to the engine 30 (e.g., the air inlet 40). The compressed air is mixed and burned with fuel in the engine 30 in an intermittent combustion cycle to drive rotation of the engine output shaft 38 and, hence, the propulsor 1002 through the gearbox 32 (e.g., the gear assembly 44). Exhaust gas from the engine 30 is directed from the exhaust outlet 42 to the interburner 34 (e.g., the inlet 46). This exhaust gas from the engine 30 is mixed and burned with fuel in the interburner 34, and the resultant combustion gas is directed from the outlet 48 to the inlet 66 and through the turbine 60. The bladed turbine rotor 76 rotationally drives the rotational assembly 70 in response to the combustion gas flow through the turbine 60. In particular, the bladed turbine rotor 76 rotationally drives the bladed compressor rotor 74, to compress the ambient air for the engine 30, and the electric generator 78 to generate electrical power for components of the electrical assembly 26 and/or the electrical aircraft loads 1006.

During operation of the propulsion system 20, the electric motor 80 may be selectively operated to drive or assist rotation of the propulsor 1002 and/or the engine 30 using electrical power from the electrical distribution system 82

(e.g., the electric generator 78 and/or the energy storage device 84). For example, during a startup sequence for the propulsion system 20, the electric motor 80 may be operated to apply rotational force to the gearbox32 (e.g., the gear assembly 44) to initiate and assist rotation of the engine output shaft 38 as the engine 30 starts. Similarly, the electric motor 80 may be operated during high-power flight conditions of the aircraft 1000 (e.g., aircraft takeoff) to assist the engine 30 in driving rotation of the propulsor 1002. In the unlikely event of a failure of the engine 30, the electric motor may be operated (e.g., electrical power from the energy storage device 84) to independently drive rotation of the propulsor 1002 for a limited period of time to facilitate safe landing or engine 30 restart.

The present disclosure configuration of the propulsion system 20 facilitates mechanical independence between the engine 30 (e.g., the engine output shaft 38) and the turbocompressor 24 (e.g., the rotational assembly 70). In other words, the engine output shaft 38 and the rotational assembly 70 are not operably connected by any mechanical coupling component or assembly such as, but not limited to, a shaft, a gearbox, a belt, a clutch, a transmission (e.g., a hydrostatic transmission), or the like. This mechanical independence between the engine 30 and the turbocompressor 24 facilitates greater flexibility in propulsion system 20 packaging (e.g., relative orientations and proximity between the engine 30 and the turbocompressor 24) within the aircraft 1000. This mechanical independence between the engine 30 and the turbocompressor 24 additionally facilitates independent speed control of the engine 30 and the turbocompressor 24, thereby facilitating optimal operation across a range of aircraft 1000 altitudes and operating conditions. For the propulsion system 20, the engine 30 provides the primary mechanical power for the propulsor 1002, while the turbocompressor 24 provides electrical power for the for components of the electrical assembly 26 and/or the electrical aircraft loads 1006. For example, independent fuel flows to the engine 30 and the interburner 34 facilitate optimized turbocompressor 24 speed and engine 30 power for aircraft 1000 propulsion while efficiently meeting electrical loading (e.g., electrical aircraft loads 1006) requirements, thereby providing significant fuel savings in comparison to conventional intermittent combustion engine or gas turbine engine configurations.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A propulsion system for an aircraft, the propulsion system comprising:

an engine assembly including an engine and an interburner, the engine including an air inlet, an exhaust outlet, and an engine output shaft, the engine output shaft is configured to be operably connected to a propulsor of the aircraft, and the engine is configured to drive rotation of the propulsor with the engine output shaft, and the interburner is connected in fluid communication with the exhaust outlet, the interburner is configured to mix and burn an exhaust gas from the engine with fuel to form a combustion gas; and a turbocompressor including a turbine and a compressor, the turbine and the compressor forming a rotational assembly, the rotational assembly including a shaft, a bladed turbine rotor of the turbine, and a bladed compressor rotor of the compressor, the shaft interconnecting the bladed turbine rotor and the bladed compressor rotor, the turbine is connected in fluid communication with the interburner to receive the combustion gas, the compressor is connected in fluid communication with the air inlet to direct a compressed air to the engine, and the rotational assembly is mechanically independent of the engine output shaft.

2. The propulsion system of claim 1, wherein the engine assembly further includes a gearbox, and the gearbox is configured to operably connect the engine output shaft to the propulsor.

3. The propulsion system of claim 2, further comprising an electrical assembly, the electrical assembly including an electric generator, the electric generator is operably connected to the rotational assembly, and the rotational assembly is configured to drive rotation of the electric generator to generate electrical power for one or more electrical aircraft loads of the aircraft.

4. The propulsion system of claim 3, wherein the electrical assembly further includes an electric motor electrically connected to the electric generator, and the gearbox is configured to operably connect the electric motor to the propulsor.

5. The propulsion system of claim 4, wherein the electric motor is operably connected to the gearbox by a one-way clutch.

6. The propulsion system of claim 4, wherein the electrical assembly further includes an energy storage device electrically connected to the electric generator and the electric motor.

7. The propulsion system of claim 1, wherein the engine assembly further includes an intercooler, the intercooler is connected in fluid communication with and between the compressor and the air inlet, and the intercooler is configured to cool the compressed air from the compressor.

8. The propulsion system of claim 7, further comprising an air intake, and the air intake is connected in fluid communication with the compressor and the intercooler to supply ambient air to the compressor and the intercooler.

9. The propulsion system of claim 8, further comprising the propulsor, and the propulsor is connected in fluid communication with and between the air intake upstream of the propulsor and the compressor and the intercooler downstream of the propulsor.

10. The propulsion system of claim 1, wherein the engine is an intermittent combustion engine.

11. An unmanned aerial vehicle (UAV) comprising:
a propulsor;
an engine assembly including an engine and an interburner,
    the engine including an air inlet, an exhaust outlet, and an engine output shaft, the engine output shaft is operably connected to the propulsor, and the engine is configured to drive rotation of the propulsor with the engine output shaft, and
    the interburner is connected in fluid communication with the exhaust outlet, the interburner is configured to mix and burn an exhaust gas from the engine with fuel to form a combustion gas;
a turbocompressor including a turbine and a compressor, the turbine is connected in fluid communication with the interburner to receive the combustion gas, the compressor is connected in fluid communication with the air inlet to direct a compressed air to the engine, and the turbocompressor is mechanically independent of the engine output shaft; and
an electrical assembly including an electric generator operably connected to the turbine, and the electrical assembly is electrically connected to one or more electrical aircraft loads of the UAV.

12. The UAV of claim 11, wherein the electrical assembly further includes an electric motor electrically connected to the electric generator, and the electric motor is operably connected to the engine output shaft and the propulsor.

13. The UAV of claim 12, wherein the electrical assembly further includes an energy storage device electrically connected to the electric generator and the electric motor.

14. The UAV of claim 11, wherein the engine assembly further includes an intercooler, the intercooler is connected in fluid communication with and between the compressor and the air inlet, and the intercooler is configured to cool the compressed air from the compressor.

15. The UAV of claim 11, wherein the engine is an intermittent combustion engine.

16. A propulsion system for an aircraft, the propulsion system comprising:
an engine assembly including an intermittent combustion engine, the intermittent combustion engine including an air inlet, an exhaust outlet, and an engine output shaft, the engine output shaft is configured to be operably connected to a propulsor of the aircraft, and the intermittent combustion engine is configured to drive rotation of the propulsor with the engine output shaft;
a turbocompressor including a turbine and a compressor, the turbine is connected in fluid communication with the exhaust outlet, the compressor is connected in fluid communication with the air inlet to direct a compressed air to the engine, and the turbocompressor is mechanically independent of the engine output shaft; and
an electrical assembly including an electric generator, an electric motor, and an electrical distribution system electrically connecting the electric generator and the electric motor, the electric generator is operably connected to the turbine, and the electric motor is operably connected to the engine output shaft.

17. The propulsion system of claim 16, wherein the engine assembly further includes an interburner, the interburner includes an interburner inlet and an interburner outlet, the interburner inlet is connected in fluid communication with the exhaust outlet, the interburner is configured to mix and burn an exhaust gas from the intermittent combustion engine with fuel to form a combustion gas and direct the combustion gas to the turbine through the interburner outlet.

18. The propulsion system of claim 16, wherein the engine assembly further includes a gearbox, and the gearbox is configured to operably connect the engine output shaft to the propulsor.

19. The propulsion system of claim 18, wherein the electric motor is operably connected to the engine output shaft by the gearbox.

20. The propulsion system of claim 16, wherein the engine assembly further includes an intercooler, the intercooler is connected in fluid communication with and between the compressor and the air inlet, and the intercooler is configured to cool the compressed air from the compressor.

* * * * *